(12) United States Patent
Kim et al.

(10) Patent No.: US 6,810,074 B1
(45) Date of Patent: Oct. 26, 2004

(54) APPARATUS AND METHOD FOR DETECTING A RECEIVED ON-OFF KEYING SIGNAL IN A CDMA MOBILE COMMUNICATION SYSTEM

(75) Inventors: Jong-Han Kim, Yongin-shi (KR); Hi-Chan Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 861 days.

(21) Appl. No.: 09/655,573

(22) Filed: Sep. 6, 2000

(30) Foreign Application Priority Data

Sep. 6, 1999 (KR) ........................................ 1999-37639

(51) Int. Cl.[7] .......................... H04B 1/69; H04B 1/707; H04B 1/713
(52) U.S. Cl. ........................ 375/147; 375/136; 375/340
(58) Field of Search .............................. 375/259–285, 375/316–352, 295, 130–153; 370/208, 319

(56) References Cited

U.S. PATENT DOCUMENTS 6,058,101 A * 5/2000 Huang et al. ............... 370/208

6,522,637 B1 * 2/2003 Mimura et al. ............. 370/319

* cited by examiner

*Primary Examiner*—Stephen Chin
*Assistant Examiner*—Curtis Odom
(74) *Attorney, Agent, or Firm*—Dilworth & Barrese, LLP

(57) ABSTRACT

An apparatus for detecting an on-off keying signal in a CDMA mobile station device is disclosed. A first calculator receives an on-off keying signal and a reference signal transmitted from a base station transmitter at a given transmission power level, despreads the received on-off keying signal, and generates a symbol power level of the despread on-off keying signal. A second calculator despreads the reference signal and generates a power level of the despread reference signal. A multiplier generates a variable threshold value by multiplying the power level of the despread reference signal by a gain determined by a ratio of the transmission power of the reference signal from the base station transmitter to the transmission power of the on-off keying signal from the base station transmitter. A comparator compares the variable threshold value with the symbol power level of the despread on-off keying signal. Further, a symbol detector detects the symbol of the on-off keying signal by comparing a comparison value from the comparator with a prescribed threshold value.

24 Claims, 7 Drawing Sheets

APPARATUS AND METHOD FOR DETECTING A RECEIVED ON-OFF KEYING SIGNAL IN A CDMA MOBILE COMMUNICATION SYSTEM

PRIORITY

This application claims priority to an application entitled "Apparatus and Method for detecting a Received On-Off Keying Signal in a CDMA Mobile Communication System" filed in the Korean Industrial Property Office on Sep. 6, 1999 and assigned Ser. No. 99-37639, the contents of which are hereby incorporated by reference.

BACKGROUND OF THE INVENTION

1. Field of the Invention

The present invention relates generally to an apparatus and method for detecting a received signal in a CDMA mobile communication system, and in particular, to an apparatus and method for detecting a received on-off keying modulated signal.

2. Description of the Related Art

In general, an existing IS-95 CDMA (Code Division Multiple Access) mobile communication system provides a voice service. However, future IMT-2000 compatible CDMA mobile communication system will provide a high-speed data service in addition to the voice services. The IMT-2000 standard aims to provide a high-quality voice service, a moving picture service, and an Internet search service.

In addition, the IMT-2000 standard provides for a new paging indicator signal using on-off keying modulation. In the common CDMA mobile communication system, a mobile station receives a paging channel from a base station and accesses its unique slot out of a plurality of slots constituting the paging channel. However, in the case where the base station provides the paging indicator signal as stated above, the mobile station demodulates its unique paging slot out of the paging slots constituting the paging channel, upon receipt of the paging indicator signal. Therefore, when the paging indicator signal is provided, the mobile station can demodulate its unique slot only when the paging indicator signal is received, rather than demodulating its unique slot whenever the paging channel is received, thereby making it possible to reduce power consumption of the mobile station. Meanwhile, for the paging indicator signal, an on-off keying signal is typically used.

FIG. 1 illustrates an example of a common demodulation device in a CDMA mobile communication system which uses a paging indicator signal. FIG. 1 shows a demodulation device wherein a transmitter is synchronized with a receiver. Such demodulation is referred to "coherent detection".

Referring to FIG. 1, a low pass filter (LPF) 110 filters a received signal in a corresponding frequency band. A sampler 120 extracts a symbol from an output of the low pass filter 110 in sync with a transmitter (not shown). A symbol detector 130 detects a symbol by comparing a value of the symbol extracted by the sampler 120 with a threshold value for symbol detection. Here, a fixed threshold value is used for the symbol detection threshold value.

FIG. 2 illustrates another example of a common demodulation device in a CDMA mobile communication system, which uses a paging indicator signal. Specifically, FIG. 2 shows a demodulation device for the case where the transmitter is not exactly synchronized with the receiver. Such demodulation is referred to "non-coherent detection".

Referring to FIG. 2, a low pass filter 210 filters a received signal in a corresponding frequency band. An envelope detector 220 extracts an envelope of the low-pass-filtered signal. A sampler 230 extracts a symbol from an output of the envelope detector 220. A symbol detector 240 detects a symbol by comparing the symbol extracted by the sampler 230 with a threshold value for symbol detection. Here, a fixed threshold value is used for the symbol detection threshold value.

The demodulators of FIGS. 1 and 2 are useful where there exists a rare variation of channel conditions and there exist only Gaussian noises, or where an on/off ratio is relatively high. That is, the demodulators employ threshold-dependent demodulation, without considering the variation of the channel conditions. Therefore, the conventional demodulators are not effective in real mobile environments where the channel conditions vary greatly and/or the on/off ratio is not so high, such as in the fading environments.

In the mobile communication environments, a received signal of the mobile station can be modeled as shown in Equation (1) below.

$$s(t) = A_c(t) \cos \omega_c t \cdot (R_i(t) + jR_q(t)) + N(t) \quad (1)$$

where s(t) indicates a signal received at the mobile station, $A_c(t)$ indicates a transmitted original signal, $R_i(t)$ and $R_q(t)$ indicate phase variation of the channel, and N(t) indicate the Gaussian noise components.

In Equation (1), if the receiver can exactly perceive the phase variation of the channel, the received signal can be represented by Equation (2) below.

$$R(t) = n_i(t) \text{ (if s0 is sent)}$$
$$R(t) = \sqrt{[R_i(t)^2 + R_q(t)^2]} \cdot A_c + n_i(t) \text{ (if s1 is sent)} \quad (2)$$

In Equation (2), transmission of s0 means that no signal is transmitted, and transmission of s1 means that a signal is transmitted. Further, $$\sqrt{[R_i(t)^2 + R_q(t)^2]} \cdot A_c$$

indicates an amplitude of the received signal, $$\sqrt{[R_i(t)^2 + R_q(t)^2]}$$

indicates phase variation components of the channel, and $n_i(t)$ indicates the in-phase components of the Gaussian noise.

That is, it is noted from Equation (2) that the amplitude of a signal varies greatly as compared with the noises, in the real mobile environments where channel conditions vary violently and the on/off ratio is not so high, such as in the fading environments. Therefore, the conventional demodulation method, which depends on the fixed threshold value, cannot accurately detect a symbol from the received signal.

SUMMARY OF THE INVENTION

It is, therefore, an object of the present invention to provide an apparatus and method for detecting a received on-off keying signal depending on a variable threshold value in a CDMA mobile communication system.

It is another object of the present invention to provide an apparatus and method for detecting a received on-off keying signal depending on a variable threshold value according to channel environments in a CDMA mobile communication system.

It is further another object of the present invention to provide an apparatus and method for detecting a received on-off keying signal depending on a variable threshold value, by using a reference signal which experiences the same channel conditions as an on-off keying signal to be demodulated, in a CDMA mobile communication system.

It is yet another object of the present invention to provide an apparatus and method for detecting a received on-off keying signal depending on a variable threshold value, by using a reference signal for estimating the channel conditions that the on-off keying modulated signal experiences, in a CDMA mobile communication system.

It is still another object of the present invention to provide an apparatus and method for detecting a received on-off keying signal depending on a variable threshold value by using the power value of a pilot channel signal for estimating the channel conditions that the on-off keying modulated signal experiences, in a CDMA mobile communication system.

It is still another object of the present invention to provide an apparatus and method for detecting a received on-off keying signal depending on a variable threshold value, by using the power of a common channel signal for estimating the channel conditions that the on-off keying modulated signal experiences, in a CDMA mobile communication system.

It is still another object of the present invention to provide an apparatus and method for detecting a received on-off keying signal depending on a variable threshold value, by using a channel signal, a power value of which can be detected in a mobile station, in a CDMA mobile communication system.

It is still another object of the present invention to provide an apparatus and method for detecting a received on-off keying signal depending on a variable threshold value, by calculating the power of a received on-off keying signal after channel passing, determining a signal detection threshold value using a power level of the channel-passed reference signal, and detecting a received on-off keying signal according to the signal detection threshold value, in a CDMA mobile communication system.

To achieve the above and other objects, an apparatus is provided for detecting an on-off keying signal in a CDMA mobile station device. A first calculator receives an on-off keying signal and a reference signal transmitted from a base station transmitter at a given transmission power level, despreads the received on-off keying signal, and generates a symbol power level of the despread on-off keying signal. A second calculator despreads the reference signal and generates a power level of the despread reference signal. A multiplier generates a variable threshold value by multiplying the power level of the despread reference signal by a gain determined by a ratio of the transmission power of the reference signal from the base station transmitter to the transmission power of the on-off keying signal from the base station transmitter. A comparator compares the variable threshold value with the symbol power level of the despread on-off keying signal. Further, a symbol detector detects the symbol of the on-off keying signal by comparing a comparison value from the comparator with a prescribed threshold value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
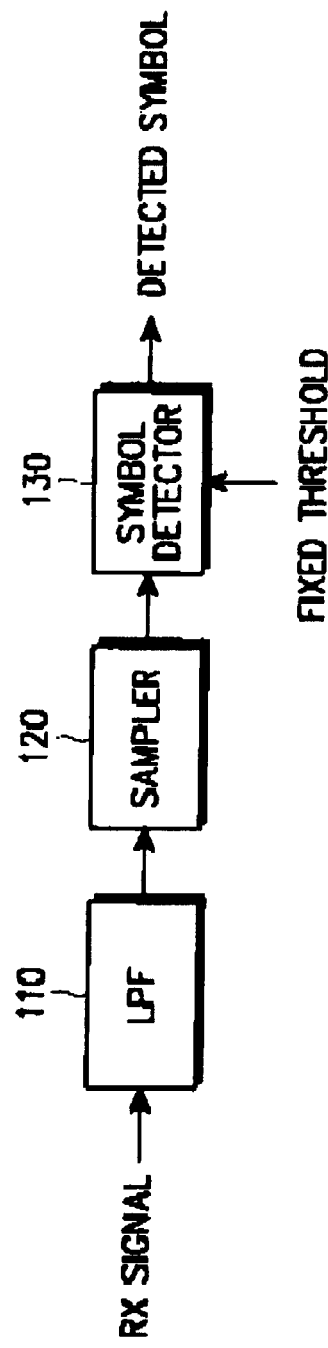
FIG. 1 is a block diagram illustrating an example of a common demodulation device for a received on-off keying signal according to the prior art.
Figure 2:
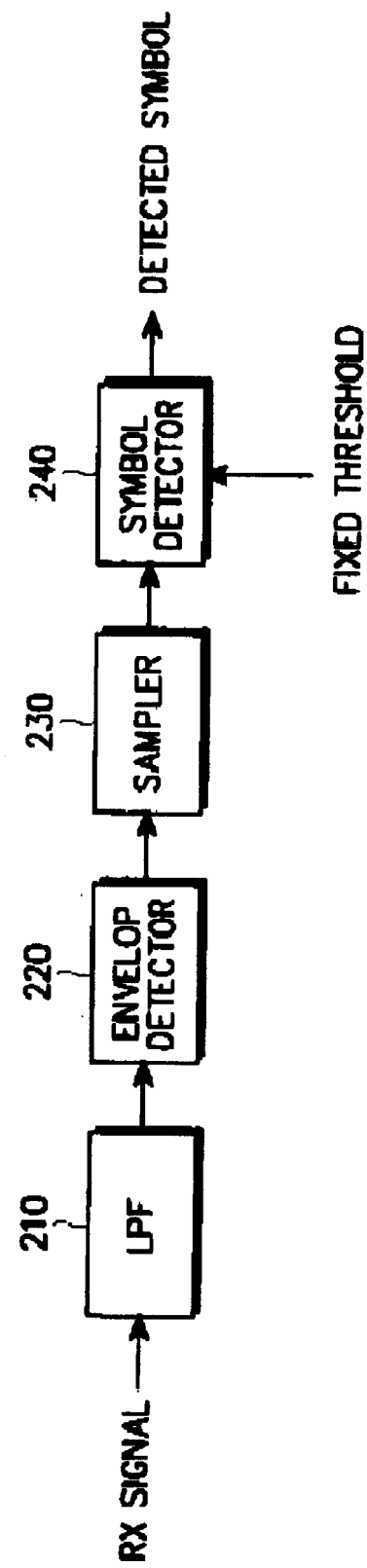
FIG. 2 is a block diagram illustrating another example of a common demodulation device for a received on-off keying signal according to the prior art.

A preferred embodiment of the present invention will be described herein below with reference to the accompanying drawings. In the following description, well-known functions or constructions are not described in detail since they would obscure the invention in unnecessary detail. In the drawings, the same numbering blocks operate the same functions.

Figure 3:
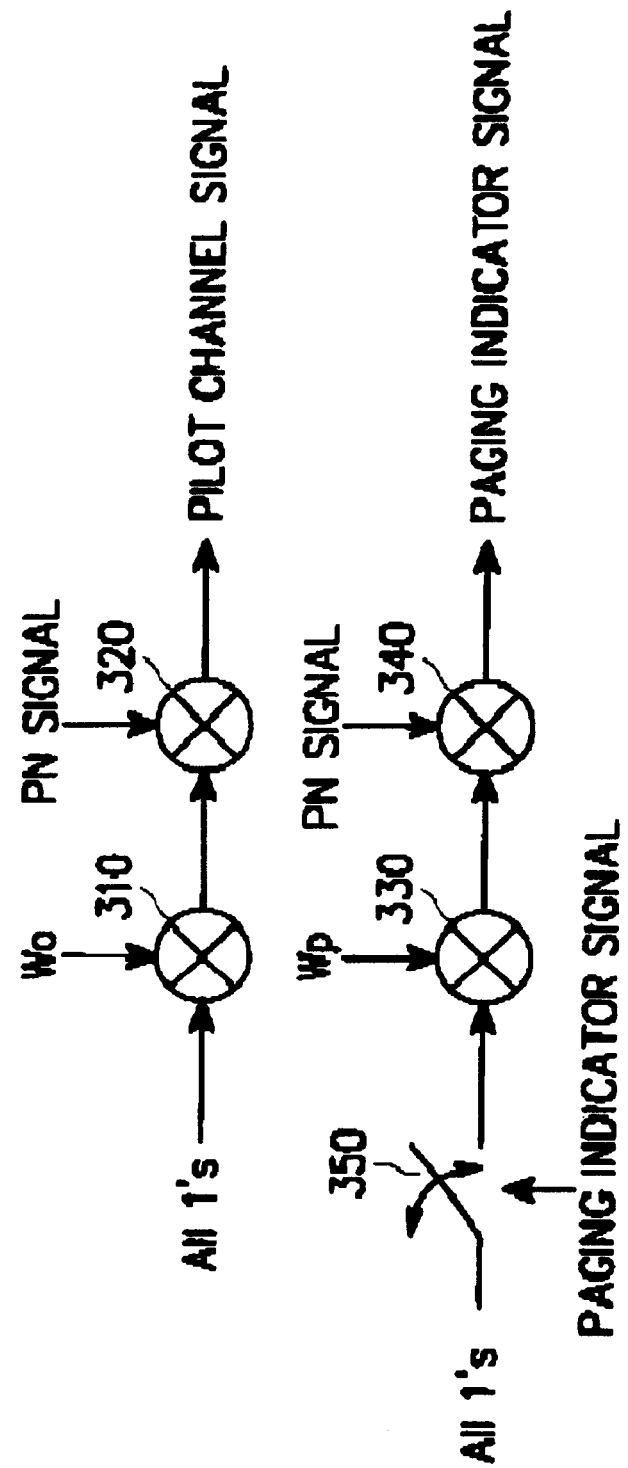
FIG. 3 is a diagram illustrating a structure of a transmitter according to an embodiment .of the present invention in a CDMA mobile communication system.

FIG. 3 illustrates a structure of a transmitter according to an embodiment of the present invention in a CDMA mobile communication system. The transmitter of FIG. 3 uses on-off keying modulation according to an embodiment of the present invention, and is divided into a part for transmitting a signal through a pilot channel and a part for transmitting a paging indicator signal.

Referring to FIG. 3, a first orthogonal spreader 310 spreads unmodulated input data by multiplying the unmodulated input data by a corresponding channelization code Wo such as a Walsh code. A first PN (Pseudo Noise) spreader 320 PN spreads an output of the first orthogonal spreader 310 by multiplying the output of the first orthogonal spreader 310 by a PN signal, and outputs a pilot channel signal. The "unmodulated data" is pure data having a value of '1'. The "channelization code" is an orthogonal code, for which a Walsh code is typically used.

A switch 350 switches on/off unmodulated input data according to a paging indicator signal, and outputs a paging indicator bit signal. A second orthogonal spreader 330 orthogonally spreads the paging indictor bit signal by multiplying the paging indicator bit signal by a corresponding channelization code Wp. A second PN spreader 340 multiplies an output of the second orthogonal spreader 330 by the PN signal, and outputs a spread paging indicator signal.

Likewise, the "unmodulated data" is pure data having a value of '1', and the "channelization code" is an orthogonal code, for which a Walsh code is typically used.

That is, the switch 350 performs a switch-on operation when a signal to be transmitted (i.e., the paging indicator signal) is '1'. Otherwise, when the signal to be transmitted (i.e., the paging indicator signal) is '0', the switch 350 performs a switch-off operation. Through this switching operation, the switch 350 outputs the paging indicator bit signal. The second orthogonal spreader 330 orthogonally spreads the paging indicator bit signal by multiplying it by a predetermined orthogonal code Wp out of a plurality of orthogonal codes. The second PN spreader 340 multiplies the orthogonally spread signal by the PN signal, and outputs a spread paging indicator signal.

Figure 4A:
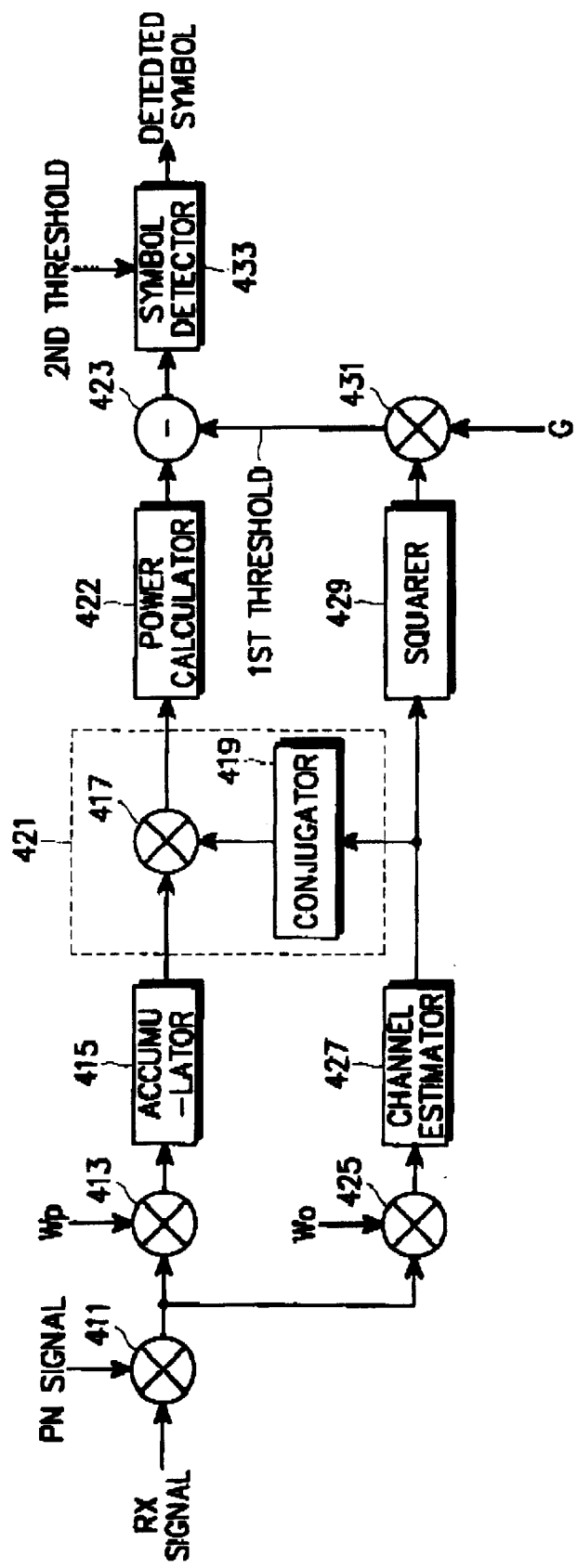
FIG. 4A is a block diagram illustrating an apparatus for detecting a received on-off keying signal according to a first embodiment of the present invention in the CDMA mobile communication system.

FIG. 4A illustrates an apparatus for detecting a received on-off keying signal according to a first embodiment of the present invention in a CDMA mobile communication system. The apparatus shown in FIG. 4A is divided into a part for receiving a signal through a pilot channel and a part for receiving an on-off keying-modulated paging indicator signal.

A PN despreader 411 PN despreads a received signal by multiplying the received signal by a PN signal. The received signal is comprised of an on-off keying-modulated paging indicator signal received through a quick paging channel and a signal received through a pilot channel. A first orthogonal despreader 413 multiplies the PN despread signal from the PN despreader 411 by a corresponding orthogonal code Wp, and outputs an orthogonally despread paging indicator signal. The orthogonal code Wp is an orthogonal code for separating a quick paging channel for transmitting the paging indicator signal. An accumulator 415 accumulates the orthogonally despread paging indicator signal for a corresponding symbol period.

A second orthogonal despreader 425 orthogonally despreads the PN despread signal by multiplying the PN despread signal by a corresponding orthogonal code Wo assigned to the pilot channel, and outputs an orthogonally despread pilot signal. A channel estimator 427 performs a channel estimating operation on the pilot signal. Here, the channel conditions that the pilot signal experiences are equal to the channel conditions that the paging indicator signal experiences. A phase compensator 421 compensates for phase errors of the paging indicator signal output from the accumulator 415 according to the channel estimation value from the channel estimator 427. A phase compensator 421 include in conjugator 419 converting the channel estimated signal to a conjugate signal and multiplier 417 multiplying the output signal of the accumulator 427 by the conjugate signal to compensate for phase errors of the paging indicator signal.

A power calculator 422 receives the phase-compensated paging indicator signal from the phase compensator 421 and calculates the power of the paging indicator signal. The phase-compensated paging indicator signal output from the power calculator 422 can be represented by Equation (3) below.

$$\text{Phase-Compensated Paging Indicator Signal} = [R_i(t)^2 + R_q(t)^2] \cdot \sqrt{a} A_p \cdot \sqrt{a} A_c \quad (3)$$

where $[R_i(t)^2 + R_q(t)^2]$ indicates the channel condition which both the pilot and paging indicator signal experience, $A_p$ indicates the power of the pilot channel signal, and $A_c$ indicates the power of the paging indicator signal.

Meanwhile, a squarer 429 squares the channel estimation value from the channel estimator 427 to calculate its power level (i.e., received pilot signal strength). The channel estimation power output from the squarer 429 can be represented by Equation (4) below.

$$\text{Channel Estimation Power} = [R_i(t)^2 + R_q(t)^2] \cdot A_p \quad (4)$$

where $[R_i(t)^2 + R_q(t)^2]$ indicates the channel condition which both the pilot and paging indicator signal experience, and $A_p$ indicates power of the pilot channel signal.

A multiplier 431 multiplies the channel estimation power by a gain G, and outputs a first threshold value. The gain G is determined by a transmission power ratio of the pilot channel signal and the paging indicator channel signal at the transmitter. Therefore, the first threshold value can be varied with channel estimation power which is changed by channel state.

The first threshold value output from the multiplier 431 can be represented by Equation (5) below.

$$\text{First Threshold Value} = [R_i(t)^2 + R_q(t)^2] \cdot A_p \cdot G \quad (5)$$

where $[R_i(t)^2 + R_q(t)^2]$ indicates the channel condition which both the pilot and paging indicator signal experience, $A_p$ indicates the power of the pilot channel signal, and G indicates the gain.

A subtractor 423 subtracts the first threshold value from the power of the phase-compensated indicator signal, output from the power calculator 422. The output of the subtractor 423 can be represented by Equation (6) below.

$$\text{Output of Subtractor } 423 = [R_i(t)^2 + R_q(t)^2] \cdot [\sqrt{a} A_p \cdot \sqrt{a} A_c - A_p \cdot G] \quad (6)$$

where $[R_i(t)^2 + R_q(t)^2]$ indicates the channel condition which both the pilot and paging indicator signal experience, $A_p$ indicates the power of the pilot channel signal, $A_c$ indicates the power of the paging indictor signal and G indicates the gain.

A symbol detector 433 detects a symbol by comparing the output of the subtractor 423 with a second threshold value determined by experimental value. That is, the symbol detector 433 determines that a symbol exists when the output from the subtractor 423 is larger than the second threshold value. Otherwise, when the output of the subtractor 423 is smaller than the second threshold value, the symbol detector 433 determines that no symbol exists. Here, the above symbol is a symbol corresponding to the received on-off keying signal, and detection of the symbol implies that the switch 350 in the transmitter has performed a switch-on operation.

The on-off keying signal detecting apparatus of FIG. 4A according to the first embodiment of the present invention has the structure such that the subtractor 423 subtracts the first threshold value from the power of the phase-compensated paging indicator signal and the symbol detector 433 detects a symbol by comparing the output of the subtractor 423 with the variable second threshold value. However, as an alternative embodiment, the symbol detector 433 may detect on/off keying symbol by comparing a variable threshold value, determined by varying the channel estimation power level for the pilot signal, and the power of the phase-compensated paging indicator signal.

Figure 4B:
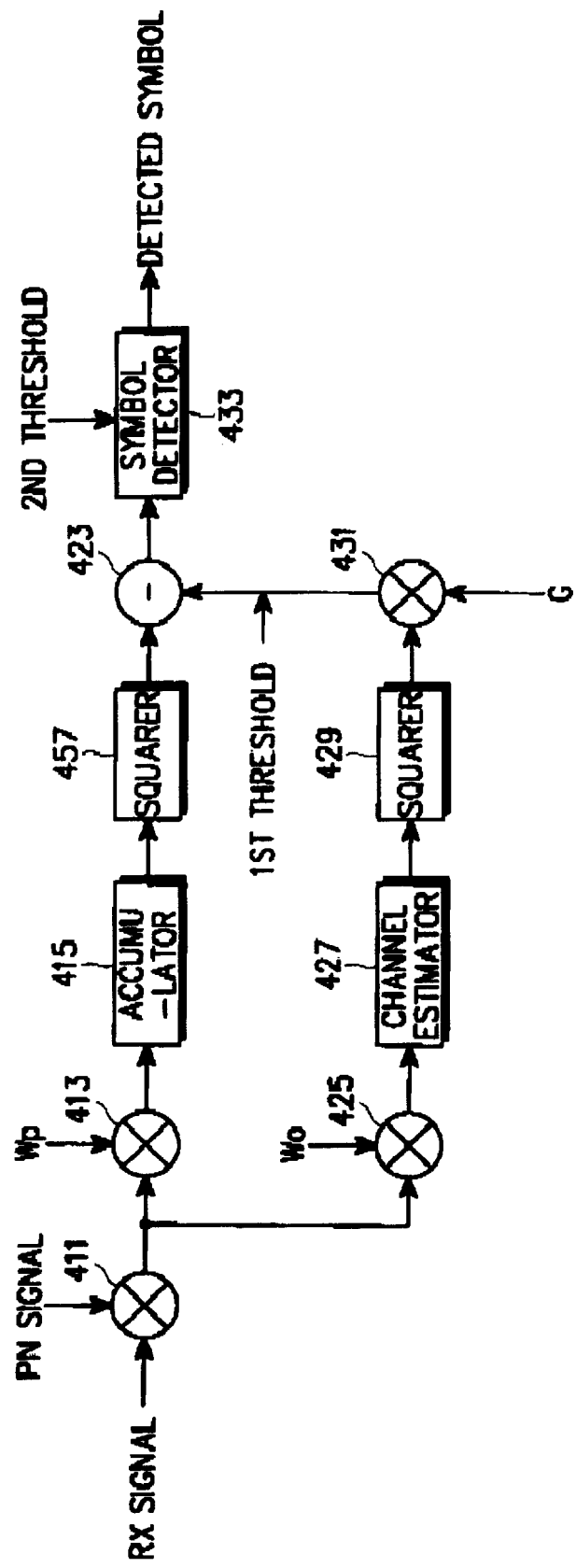
FIG. 4B is a block diagram illustrating an apparatus for detecting a received on-off keying signal according to a second embodiment of the present invention in the CDMA mobile communication system.

FIG. 4B illustrates an apparatus for detecting a received on-off keying signal according to a second embodiment of the present invention in a CDMA mobile communication system.

Referring to FIG. 4B, the apparatus calculates the power by non-coherent detection using a squarer 457, rather than compensating for phase of the paging indicator signal accumulated by an accumulator 415 for one symbol period after orthogonal despreading. A subtractor 423 subtracts a first threshold value from the power of the paging indicator signal calculated by the squarer 457, and then compares the result with the second threshold value to detect a symbol in symbol detector 433. Here, the first threshold value and the second threshold value can be defined in the same method as in the first embodiment. For reference, the paging indicator signal power calculated by the squarer 457 can be represented by Equation (7) below.

$$\text{Paging Indicator Signal Power} = [R_i(t)^2 + R_q(t)^2] \cdot A_c \quad (7)$$

where $[R_i(t)^2 + R_q(t)^2]$ indicates the power of the fading channel(the channel condition which both the pilot and paging indicator signal experience), and $A_c$ indicates the power of the paging indictor signal.

That is, in the second embodiment, the apparatus includes the squarer 457 instead of the method for compensating for a phase error of the paging indicator signal.

Although the first and second embodiments use the pilot channel signal as a reference signal for estimating the channel conditions that the on-off keying modulated signal experiences, it is also possible to use a channel signal, such as a common channel signal, the power of which the receiver can perceive.

Figure 5A:
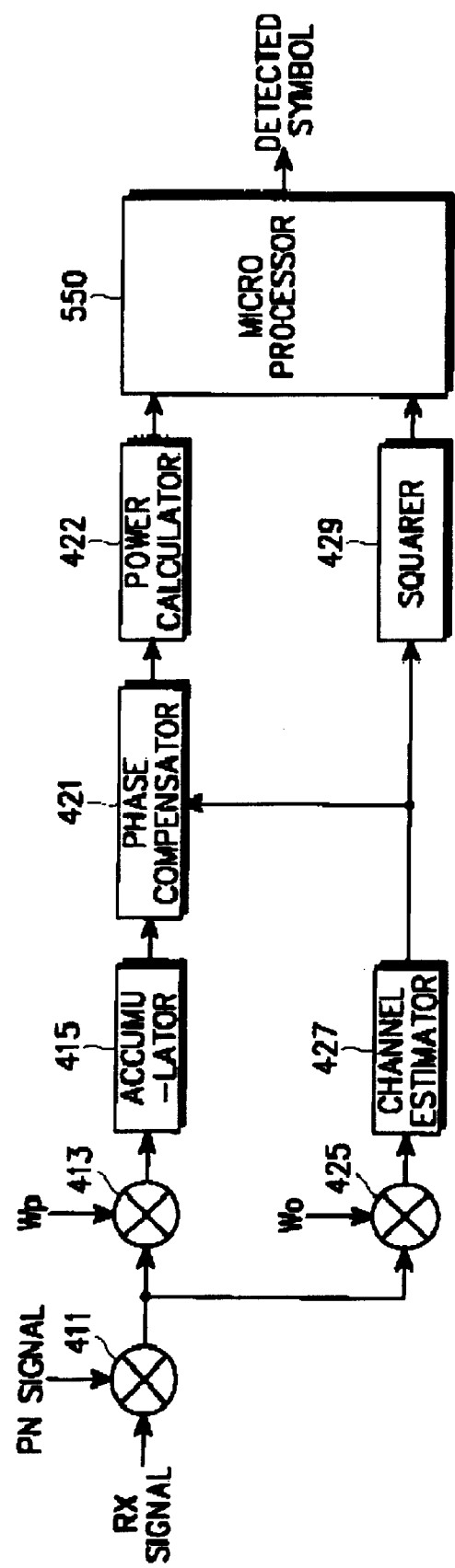
FIG. 5A is a block diagram illustrating an apparatus for detecting a received on-off keying signal according to a third embodiment of the present invention in the CDMA mobile communication system.

FIG. 5A illustrates an apparatus for detecting a received on-off keying signal according to a third embodiment of the present invention in a CDMA mobile communication system.

Referring to FIG. 5A, a microprocessor 550 receives paging indicator signal power, calculated by a power calculator 422 after phase compensation by a phase compensator 421, and channel estimation power output from a squarer 429. Further, the microprocessor 550 calculates a symbol detection threshold value depending on the channel estimation power. Calculation of the symbol detection threshold value can be implemented using a memory table. That is, it is possible to detect a specific symbol detection threshold value by storing symbol detection threshold values in a table in association with different channel estimation powers and then accessing the table according to received channel estimation power. The microprocessor 550 performs symbol detection by comparing the calculated symbol detection threshold value with the power of the phase-compensated paging indicator signal.

Figure 5B:
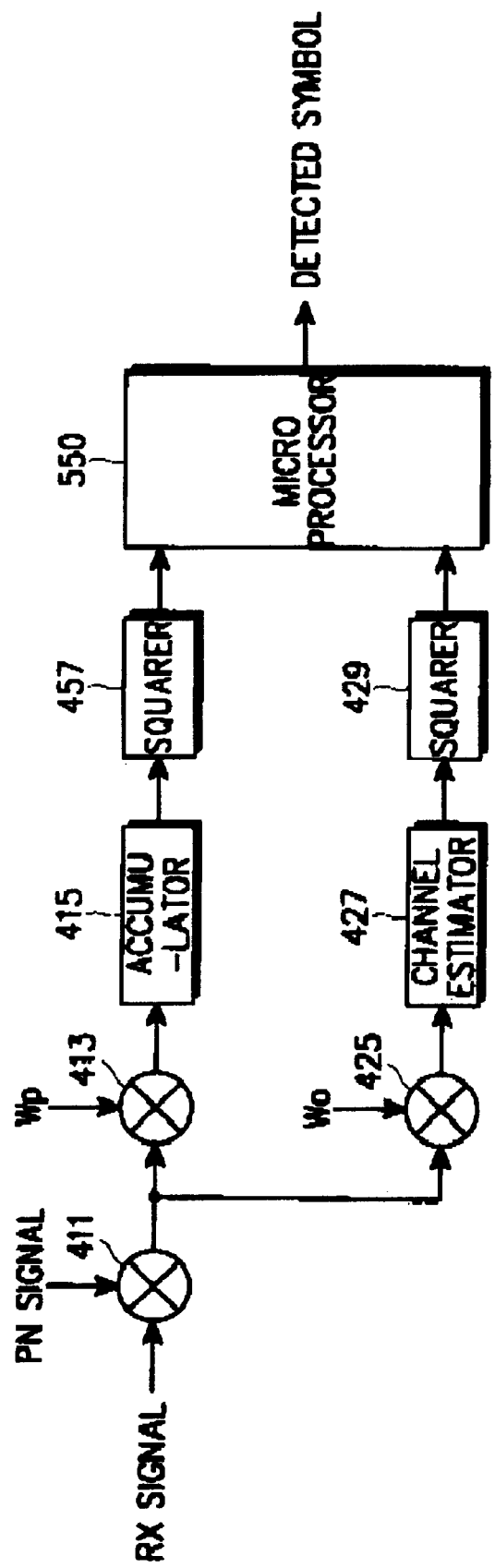
FIG. 5B is a block diagram illustrating an apparatus for detecting a received on-off keying signal according to a fourth embodiment of the present invention in the CDMA mobile communication system.

FIG. 5B illustrates an apparatus for detecting a received on-off keying signal according to a fourth embodiment of the present invention in a CDMA mobile communication system.

Referring to FIG. 5B, a microprocessor 550 receives paging indicator signal power output from a first squarer 457 and channel estimation power output from a second squarer 429. The microprocessor 550 calculates a symbol detection threshold value depending on the channel estimation power. Calculation of the symbol detection threshold value can be performed in the same method as in the third embodiment. The microprocessor 550 performs symbol detection by comparing the calculated symbol detection threshold value with the power of the phase-compensated paging indicator signal.

Figure 6:
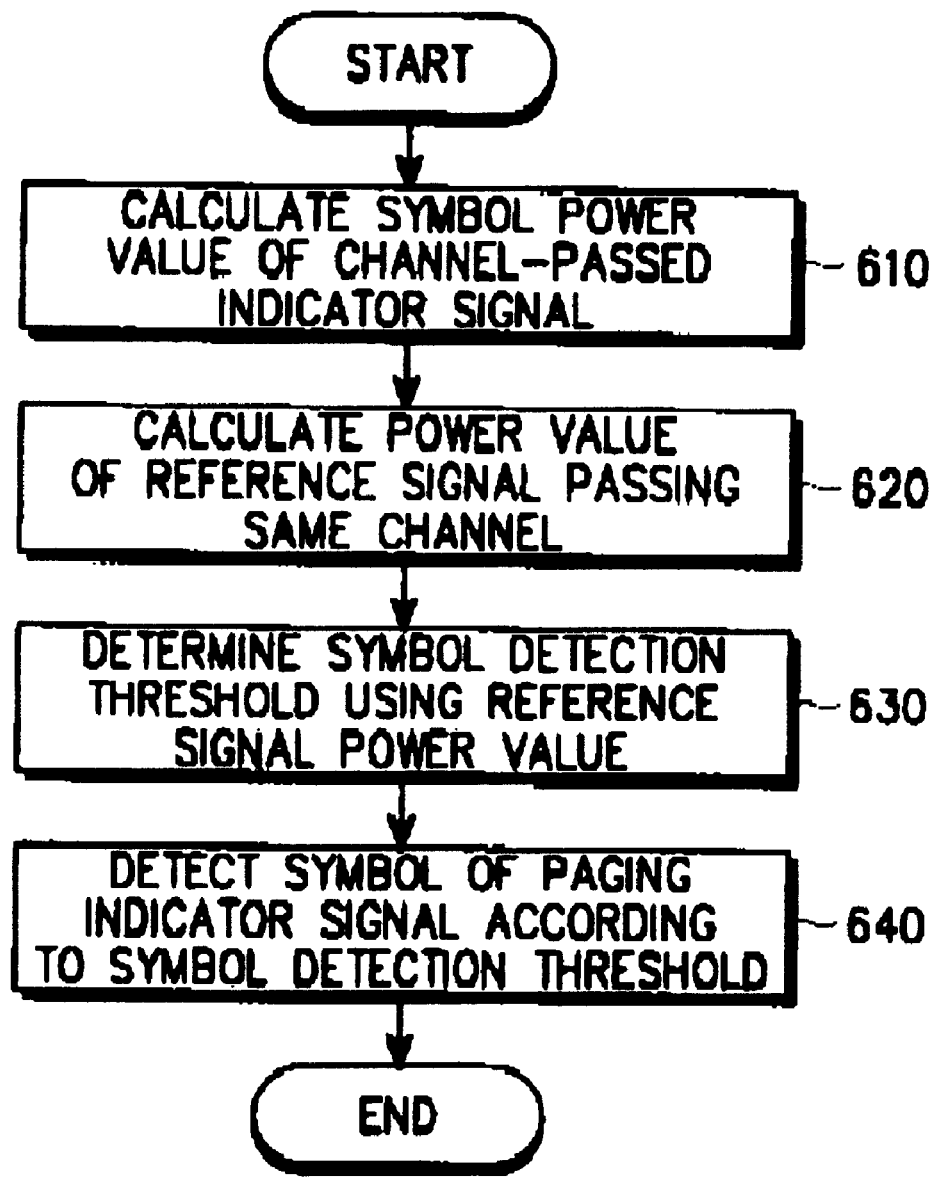
FIG. 6 is a flow chart illustrating a method for detecting a received on-off keying signal according to an embodiment of the present invention.

FIG. 6 illustrates a procedure for detecting a received on-off keying signal according to an embodiment of the present invention. The procedure will be described with reference to FIGS. 4A to 5B.

In step 610, the on-off keying signal detection apparatus calculates symbol power of a channel-passed paging indicator signal. Here, the calculating operation may include despreading of the received signal, symbol accumulation and phase compensation. In step 620, the on-off keying signal detection apparatus calculates the power of the reference signal which passes the same channel. Here, the reference signal is a signal, strength of which the receiver previously knows, and can be a common channel signal. Here, the calculating operation may include an operation of calculating channel estimation power of the reference signal. In step 630, the on-off keying signal detection apparatus determines a symbol detection threshold value depending on the reference signal power. Here, the detecting operation may include an operation of converting the reference signal power level by multiplying the reference signal power by a prescribed gain. As an alternative example, the detecting operation may include an operation of previously storing symbol detection threshold values in a table in association with reference signal energies and then determining a symbol detection threshold value according to received reference signal power. In step 640, the on-off keying signal detection apparatus detects a symbol of the paging indictor signal according to the determined symbol detection threshold value. This can be done by comparing the paging indicator signal power with the symbol detection threshold value.

In summary, the on-off keying signal detection apparatus and method according to the present invention detects a paging indicator signal using a variable threshold value. Here, the variable threshold value is determined using a reference signal which experiences the same channel conditions as the paging indicator signal. The reference signal can be a common channel signal, the strength of which is previously known to the receiver. The threshold value for symbol detection is calculated by converting the reference signal power level by multiplying the reference signal power by a predetermined gain.

As described above, the on-off keying signal detection apparatus and method according to the present invention exactly detects a symbol of a received on-off keying signal using a variable threshold value determined by channel estimation power of a reference signal which experiences the same channel conditions as the paging indicator signal. Hence, the novel apparatus and method can optimally detect a received on-off keying signal in the mobile environments where the channel conditions vary greatly and the on/off ratio is not so high, such as those conditions found in the fading environments.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for detecting an on-off keying signal in a CDMA (Code Division Multiple Access) mobile station device, comprising:

a first calculator for receiving an on-off keying signal and a reference signal transmitted from a base station transmitter at a given transmission power level, respectively, for despreading the received on-off keying signal, and for generating a symbol power level of the despread on-off keying signal;

a second calculator for despreading said reference signal and for generating a power level of the despread reference signal;

a multiplier for generating a variable threshold value by multiplying said power level of the despread reference signal by a gain determined by a ratio of the transmission power of the reference signal from the base station transmitter to the transmission power of the on-off keying signal from the transmitter; and a comparator for comparing said variable threshold value with said symbol power level of the despread on-off keying signal.

2. The apparatus as claimed in claim 1, wherein the reference signal is a common channel signal from the transmitter.

3. The apparatus as claimed in claim 1, wherein the reference signal is a pilot channel signal.

4. The apparatus as claimed in claim 1, further comprising a symbol detector for detecting a symbol of the on-off keying signal by comparing a comparison value from the comparator with a prescribed threshold value.

5. An apparatus for detecting an on-off keying signal in a CDMA mobile station device, comprising:

a despreader for despreading an on-off keying signal and a reference signal received from a base station transmitter with different orthogonal codes;

a phase compensator for compensating a phase error of a symbol of the despread on-off keying signal using the despread reference signal;

a first calculator for generating a symbol power level of the phase-compensated on-off keying signal;

a second calculator for generating a power level of the despread reference signal;

a multiplier for generating a variable threshold value by multiplying the power level of the despread reference signal by a gain determined by a ratio of the transmission power of the reference signal from the base station transmitter to the transmission power of the on-off keying signal from the base station transmitter; and a comparator for comparing the variable threshold value with the symbol power level of the phase-compensated on-off keying signal.

6. The apparatus as claimed in claim 5, wherein the reference signal is a common channel signal from the base station transmitter.

7. The apparatus as claimed in claim 5, wherein the reference signal is a pilot channel signal from the base station transmitter.

8. The apparatus as claimed in claim 5, further comprising a symbol detector for detecting a symbol of the on-off keying signal by comparing a comparison value from the comparator with a prescribed threshold value.

9. An apparatus for detecting an on-off keying signal in a CDMA mobile station device, comprising:

a first calculator for despreading an on-off keying signal transmitted from a base station transmitter at a given power level with a prescribed orthogonal code, and for generating a symbol power level of the despread on-off keying signal;

a second calculator for despreading a reference signal transmitted from the base station transmitter at a given power level with a prescribed orthogonal code, and for generating a power level of the despread reference signal; and a controller for generating a variable threshold value depending on the power level of the despread reference signal, and for detecting a symbol of the on-off keying signal by comparing the variable threshold value with the symbol power level of the despread on-off keying signal.

10. The apparatus as claimed in claim 9, wherein the variable threshold value is determined by multiplying the power level of the despread reference signal by a gain determined by a ratio of the transmission power of the reference signal from the base station transmitter to the transmission power of the on-off keying signal from the base station transmitter.

11. The apparatus as claimed in claim 9, wherein the reference signal is a common channel signal from the base station transmitter.

12. The apparatus as claimed in claim 9, wherein the reference signal is a pilot channel signal from the base station.

13. An apparatus for detecting an on-off keying signal in a CDMA mobile station device, comprising:

a despreader for despreading an on-off keying signal and a reference signal received from a base station transmitter at a given power level with different orthogonal codes;

a phase compensator for compensating for a phase error of a symbol of the despread on-off keying signal using the despreading reference signal;

a first calculator for generating a symbol power level of the phase-compensated on-off keying signal;

a second calculator for generating a power level of the despread reference signal; and a controller for generating a variable threshold value depending on the power level of the despread reference signal, and for detecting a symbol of the on-off keying signal by comparing the variable threshold value with the symbol power level of the phase-compensated on-off keying signal.

14. The apparatus as claimed in claim 13, wherein the variable threshold value is determined by multiplying the power level of the despread reference signal by a gain determined by a ratio of the transmission power of the reference signal from the base station transmitter to the transmission power of the on-off keying signal from the base station transmitter.

15. The apparatus as claimed in claim 13, wherein the reference signal is a common channel signal from the base station transmitter.

16. The apparatus as claimed in claim 13, wherein the reference signal is a pilot channel signal from the base station.

17. A method for detecting an on-off keying signal in a CDMA mobile station device including a first calculator for receiving an on-off keying signal and a reference signal transmitted from a base station transmitter at a given transmission power level, for despreading the received on-off keying signal, and for generating a symbol power level of the despread on-off keying signal; and a second calculator for despreading the reference signal and generating a power level of the despread reference signal, the method comprising the steps of:

generating a variable threshold value by multiplying the power level of the despread reference signal by a gain determined by a ratio of the transmission power of the reference signal from the base station transmitter to the transmission power of the on-off keying signal from the base station transmitter; and comparing the variable threshold value with the symbol power level of the despread on-off keying signal.

18. The method as claimed in claim 17, wherein the reference signal is a common channel signal from the base station transmitter.

19. The method as claimed in claim 17, wherein the reference signal is a pilot channel signal from the base station transmitter.

20. A method for detecting an on-off keying signal in a CDMA mobile station device, comprising the steps of:

despreading an on-off keying signal and a reference signal transmitted from a base station transmitter at a given transmission power level with different orthogonal codes;

compensating a phase of a symbol of the despread on-off keying signal using the despread reference signal;

generating a symbol power level of the phase-compensated on-off keying signal;

generating a power level of the despread reference signal; and comparing the symbol power level of the phase-compensated on-off keying signal with a variable threshold value determined by channel state of the reference signal.

21. The method as claimed in claim 20, wherein the reference signal is a common channel signal from the base station transmitter.

22. The method as claimed in claim 20, wherein the reference signal is a pilot channel signal from the base station transmitter.

23. A method for detecting an on-off keying signal in a CDMA mobile station device, comprising the steps of:

despreading an on-off keying signal transmitted from a base station transmitter at a given power level with a prescribed orthogonal code, and generating a symbol power level of the despread on-off keying signal;

despreading a reference signal transmitted from the base station transmitter at a given power level with a prescribed orthogonal code, and generating a power level of the despread reference signal; and generating a variable threshold value depending on the power level of the despread reference signal, and detecting a symbol of the on-off keying signal by comparing the variable threshold value with the symbol power level of the despread on-off keying signal.

24. A method for detecting an on-off keying signal in a CDMA mobile station device, comprising the steps of:

despreading an on-off keying signal and a reference signal transmitted from a base station transmitter at a given power level with different orthogonal codes, and compensating a phase of a symbol of the despread on-off keying signal using the despreading reference signal;

generating a symbol power level of the phase-compensated on-off keying signal;

generating a power level of the despread reference signal; and generating a variable threshold value depending on the power level of the despread reference signal, and detecting a symbol of the on-off keying signal by comparing the variable threshold value with the symbol power level of the phase-compensated on-off keying signal.

* * * * *